July 16, 1929.    A. R. GOLRICK    1,720,727
PROCESS FOR MAKING GRAINING PLATES
Filed Oct. 8, 1927    2 Sheets-Sheet 1
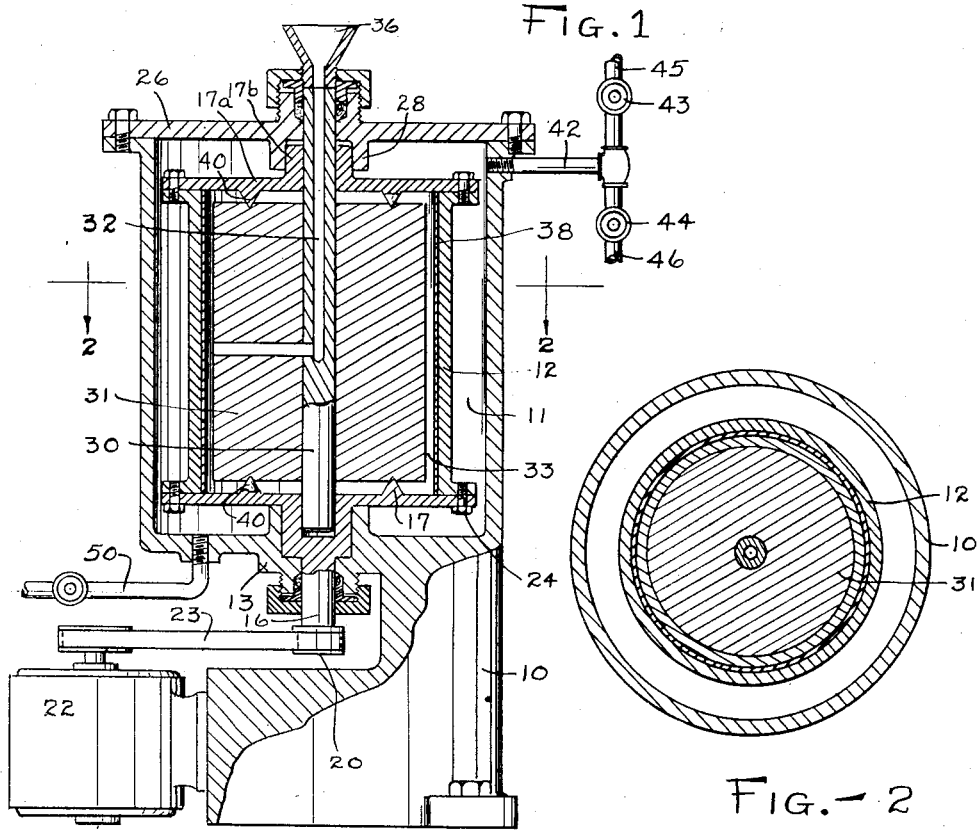
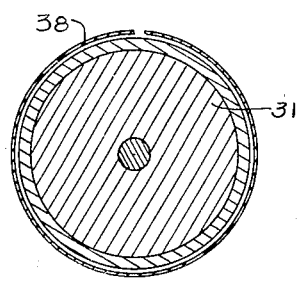

Patented July 16, 1929.

1,720,727

UNITED STATES PATENT OFFICE.

ALBERT R. GOLRICK, OF SHAKER HEIGHTS, OHIO, ASSIGNOR TO THE OXFORD VARNISH CORPORATION, OF DETROIT, MICHIGAN, A CORPORATION OF MICHIGAN.

PROCESS FOR MAKING GRAINING PLATES.

Application filed October 8, 1927. Serial No. 224,825.

This invention is concerned with the art of making printing surfaces, and has for its general object the provision of a process for effecting the formation of printed surfaces by the use of centrifugal force. More specifically, my invention has for one of its objects the provision of a process for the manufacture of metallic photogravure printing rolls.

Other objects of my invention will become apparent from the following description of some preferred methods for the utilization thereof, and the essential characteristics are summarized in the claims.

Figure 4:
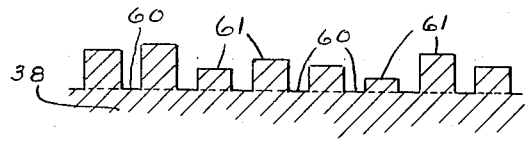
Figure 5:
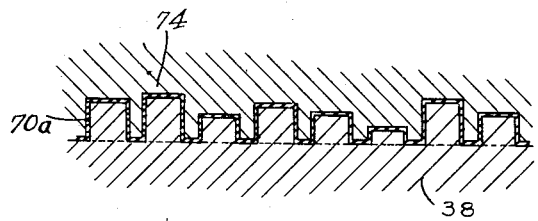
Figure 6:
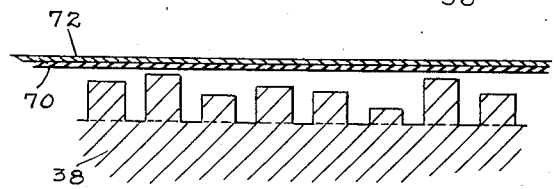
Figure 7:
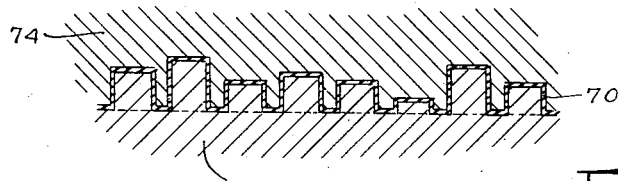
Figure 8:
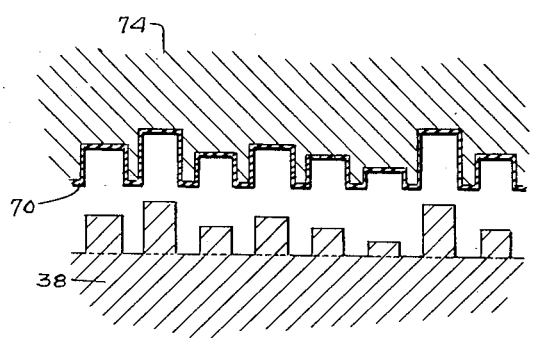

In the drawings, Fig. 1 is a cross sectional elevation of an apparatus adaptable to the fulfilling of certain steps of my process in the formation of printing surfaces in cylindrical form; Fig. 2 is a cross sectional view taken substantially along the line 2—2 of Fig. 1; Fig. 3 is a cross sectional view similar to the view shown in Fig. 2, but illustrating a slightly altered condition of the form of the printing surface; Fig. 4 is an enlarged fragmentary cross sectional view of a reverse intaglio form utilizable in my process. Fig. 5 shows one manner of obtaining the printing form by depositing an electrotype metal on the surface shown in Fig. 4. Fig. 6, shows another manner of obtaining the copper plate by superposing a copper and suitable foil over the reverse form shown in Fig. 4. Fig. 7 shows the step of applying molten metal to the copper foil and soldering foil shown in Fig. 6 whereby the foil is caused to conform to the configurations of the reverse surface shown in Fig. 4. Fig. 8 shows the finished printing surface stripped or removed from the reverse surface shown in Fig. 4.

My invention contemplates the use of an apparatus adaptable for the exertion of centrifugal force upon the molten substance which is eventually to become the base or body of a cylinder having a printing surface formed thereon and for the purposes of illustration only such printing surfaces will be here described as corresponding in surface texture to that of a photogravure plate, although it will be obvious to those skilled in the art that the process herein set forth is readily adaptable to effecting the formation of half-tone printing surfaces.

Generally, my process is as follows:—The object, of which a picture is to be reproduced, is photographed and a photogravure master plate is then etched in the well known manner by the use of a carbon resist, this master plate, however, being a reverse plate, that is, a plate wherein the ridges of the screen lines do not constitute the surface of the plate, the surface relative to the screen lines being minutely non-cylindrical.

The master plate may then be curled to cylindrical form to be positioned within a supporting cylinder mounted to be revolved at sufficient speed to cause molten type metal to assume cylindrical form while in a molten condition through the influence of centrifugal force. Hence, when a master plate is placed within this revolving cylinder with the etched surface thereof inwardly disposed, the molten type metal is caused to be pressed against the etched surface of the cylindrically formed master plate, and by reason thereof to fill all of the engraved or etched interstices of the master plate cylinder. The revolving cylinder may be constructed in such manner that a cooling medium, such as water, may be introduced thereinto to cause a chilling of the molten mass of type metal, thus causing the latter to solidify and to shrink slightly away from the engraved surface of the master plate. The type metal cylinder may then have the printing face thereof coated with a suitable electrolytic metal to impart to the type metal cylinder a wearing quality in a well known manner.

In the drawings, in Fig. 1, I show a suitable apparatus forming the cylinder hereinbefore referred to, the apparatus may comprise an upright frame 10 having a cavity 11, suitably formed to receive a rotatable jacket 12. An appropriate bearing and stuffing box are provided as shown at 13 whereby the stub shaft of a rotatable disk 17 may extend therethrough to carry an exteriorly disposed pulley 20 or equivalent member, by which the disk is rotated by a motor 22 through a chain or belt 23. The disk 17 has secured thereto, by bolts 24, rotating jacket 12. The housing 10 is disclosed as having a bearing member 26 which supports an upper disk member (17$^a$) corresponding in function and shape in so far as the process is concerned to the disk 17 and serves to close an upper end of the revolving cylinder or jacket 12. The disk 17$^a$ is provided with a hub 17ᵇ engaging a bearing portion 28 formed on a closure member 26. The disk members 17 and 17ᵃ are provided with aligned openings to receive a core shaft 30 which carries a core member 31.

The shaft 30 and core member 31 are rigidly attached to each other and are provided with a passageway 32 which establishes communication between the casting chamber 33 within the jacket 12 and a stationary pouring funnel 36 supported in any suitable manner, whereby the molten type metal may be charged therethrough and pass through the passageway 32 to the casting chamber 33 of the jacket 12.

The cylindrically formed master plate is shown in cross-section at 38 and may be disposed to fit snugly within the jacket 12 and be firmly supported thereby. The disks 17 and 17ᵃ are provided with lugs 40 engaging in suitable openings formed in the ends of the core member 31, whereby the core member is rotated in unison with the jacket 12 when the latter is rotated.

To chill the jacket, a water line 42 is tapped into the upper part of the casing chamber 11, and by use of valve members 43 and 44 controlling a steam line 45 and water line 46 respectively the temperature can be regulated. The rate of chilling of the apparatus also may be controlled by an outlet line for the escape of steam or water, as shown at 50.

The use of this apparatus may be as follows:—a master plate is first formed by etching in the manner described to produce a reverse etching, such as is shown in Fig. 4, and wherein the bottom surfaces of the channels 60 corresponding to the screen lines of the etching, are all of the same depth, but the intermediate surfaces 61 vary in height. The master plate is then curled to a cylindrical form and fitting within the jacket 12. The core 31 is then placed in the apparatus and the disk 17ᵇ bolted in place and thereafter the closure member 26 placed upon the casing 10. The jacket 12 is then set in rotation by starting the motor 22 and the rotating jacket is then ready to be charged with molten metal from the spout 36. As the molten metal passes into the casting chamber 33 through the passageway 32, it is caused to flow over the entire surface of the etched master cylinder. The amount of molten metal required to fill the casting chamber 33 having been predetermined, none of the molten metal will remain in the passageway 32. The apparatus may then be gradually chilled by the introduction of moist steam and thereafter hot water, gradually reducing the temperature by the use of cold water, whereupon the solidified cast cylinder of type metal will shrink away from the etched surface of the plate 12, thus permitting a ready removal of the apparatus when the jacket 12 is opened.

The cast type metal cylinder may then be treated to an electrolytic bath and a metal coating of any desired thickness of surfacing metal, may be deposited thereon within practical limits.

If it is desired, the type metal cylinder may have formed thereon a type foil surface, which may be effected in the following manner. As the etching cylinder 12 is placed within the apparatus, it then may be lined with thin copper foil and the inner exposed face of the foil may be suitably treated with a fluxing solution. The apparatus can then be assembled in the manner hereinbefore described, and the type metal cast into the casting chamber 33 through the passageway 32, as above set forth. If desired, this foil may be placed on the etched inner surface of the cylinder electromagnetically in the well known manner. By rotating the jacket 12 at a high speed, an extremely high centrifugal force is exerted upon the copper foil, causing it to be intimately pressed into the etchings of the master plate surface, whereupon the apparatus may be chilled in the manner set forth. The copper foil is thus intimately and minutely backed up by the type metal by reason of the application of the centrifugal force to the type metal causing the same to exert a uniform pressure upon the foil in all radial directions. Thereafter the shrinking of the type metal carries with it the foil with the detail of the etched surface of the master plate in a form reverse to the form of the master plate, but corresponding to the usual photogravure form.

In Fig. 5 I show an enlarged cross section of the reverse surface in Fig. 4 which has been treated with an electrotype deposit 70ᵃ, and which is backed with the type metal 74.

The steps of the last described process are presented in Figs. 6, 7 and 8, wherein in Fig. 6 the foil 70 is shown as having been placed over the etched surface of the master plate 38, the foil having been previously prepared on its upper surface with a flux, and as shown, a thin sheet of solder foil 72 is placed thereover. In Fig. 7 the master cylinder plate is shown with the copper foil pressed intimately into the interstices thereof, the solder foil 72 having fused with the type metal, the type metal being indicated by the reference numeral 74. In Fig. 8 is shown in cross-section the cylinder 38 with the type metal 74 in solidified form and the copper foil or electrotype facing thereof in the shrunken condition and out of contact with the engraving on the master cylinder.

From the foregoing description of my invention, it will be seen that my method affords a production of engraved printing cylinders in a very simple economical manner and by reason of the application of the type metal to the master cylinder while maintaining the type metal in a molten state, assures the flowing of the type metal into all of the minute openings in the engraved surface of the master plate through the influence of centrifugal force. The apparatus shown and described may be preheated if desired by the use of superheated steam to prevent any prechilling or presolidification of the type metal before the latter has been suitably acted upon by centrifugal force to bring about the detailed finish desired.

It will be obvious to any one skilled in the art that any suitable solidifiable material other than type metal may be used to form the body of the printing cylinder.

I claim:

1. A process which includes the steps of providing a reverse etching upon a cylindrically formed member, placing over said etched surface a thin copper foil substantially treated to cause the adherence thereto of type metal, casting metal into contact with said copper foil and subjecting the cylinder, copper foil, and type metal to the influence of centrifugal force to cause the molten metal to assume a cylindrical form and to also cause the type metal to force the foil into the interstices of the etched surface of the cylinder.

2. A process which includes the steps of providing a reverse etching upon a cylindrically formed member placing over said etched surface, a thin copper foil substantially treated to cause the adherence thereto of type metal cast into contact therewith and subjecting the cylinder, copper foil, and type metal to the influence of centrifugal force to cause the molten metal to assume a cylindrical form and controlling the temperature of said metal and cylinder while the metal is being thus processed.

3. A process which includes the steps of providing a reverse printing pattern upon a cylindrically formed metal member, placing upon said pattern surface a thin layer of surfacing metal, treating the surfacing metal to cause the adherence of type metal thereto, casting molten metal into contact with said treated surfacing metal and subjecting the metal member carrying the printing pattern, the surfacing metal and molten metal to the influence of centrifugal force to thereby cause the molten metal to assume a cylindrical form and to also cause the surfacing metal to intimately adhere to the cast metal.

4. A process which includes the steps of providing a reverse printing pattern upon a cylindrically formed metal member, placing upon said pattern surface a thin layer of surfacing metal, treating the surfacing metal to cause the adherence of type metal thereto, casting molten metal into contact with said treated surfacing metal while causing the molten metal to assume a cylindrical form and to also cause the surfacing metal to intimately adhere to the cast metal.

In testimony whereof, I hereunto affix my signature.

ALBERT R. GOLRICK.